United States Patent [19]

Gager, Jr.

[11] 4,226,463
[45] Oct. 7, 1980

[54] WINDSHIELD MOUNTING ASSEMBLY

[76] Inventor: Lawrence J. Gager, Jr., P.O. Box 16212, Jacksonville, Fla. 32216

[21] Appl. No.: 947,513

[22] Filed: Oct. 2, 1978

[51] Int. Cl.³ ............................................. B62J 17/00
[52] U.S. Cl. ................................ 296/78.1; 280/289 S
[58] Field of Search ................. 296/78 R, 78.1, 84 R, 296/84 A, 84 D; 280/289 S, 289 G

[56] References Cited

U.S. PATENT DOCUMENTS

| | | | |
|---|---|---|---|
| 3,462,188 | 8/1969 | Edgar | 296/78.1 |
| 3,801,152 | 4/1974 | Tims | 296/78.1 |

Primary Examiner—John J. Love
Assistant Examiner—John A. Carroll

[57] ABSTRACT

A windshield mounting assembly comprising a handlebar clamp including two elongated brackets having concave central facing portions defining an opening and adjacent end portions with aligned apertures defining first and second passageways wherein one bracket includes an outwardly extending element having a passage aligned with the first passageway, and a socket adjacent the second passageway for receiving a headed fastener; an angular windshield mounting member including an outer end portion having bifurcated legs with a windshield supporting ledge therebetween and aligned apertures in the legs receiving a windshield fastening element, and further including an inner end portion having a passageway aligned with the element aperture; and a pivotal connecting element extending through the element aperture and the passageway and disposing the mounting member in fixed relationship with the handlebar clamp. The passageway opens into a recessed socket having surfaces in abutting relationship with shoulder portions of the connecting element. Spaced reinforcing flanges extend continuously from the socket to adjacent an aperture of one leg and indentations extend from the other leg to the inner end portion defining a reinforcing web therebetween.

22 Claims, 5 Drawing Figures

U.S. Patent  Oct. 7, 1980  4,226,463
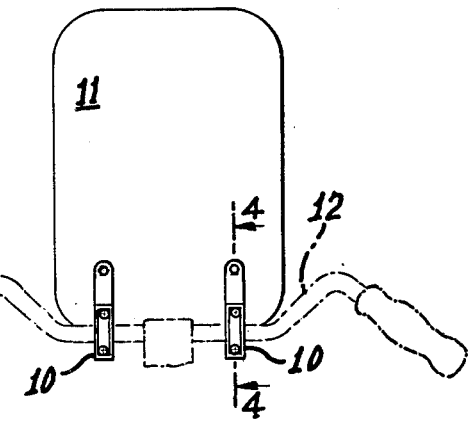
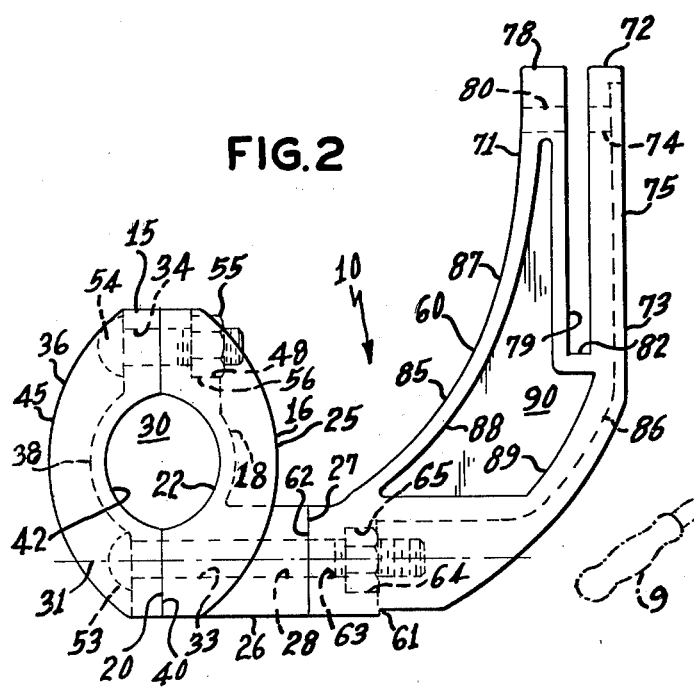
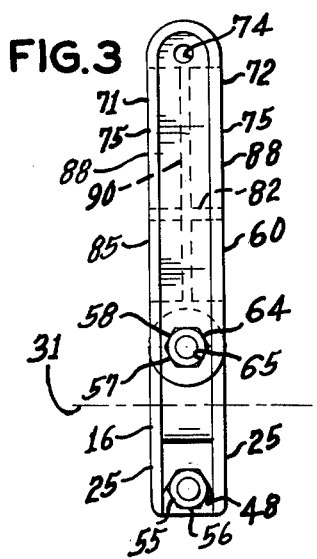
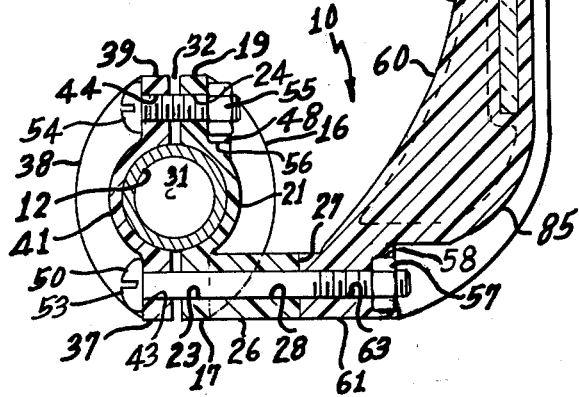
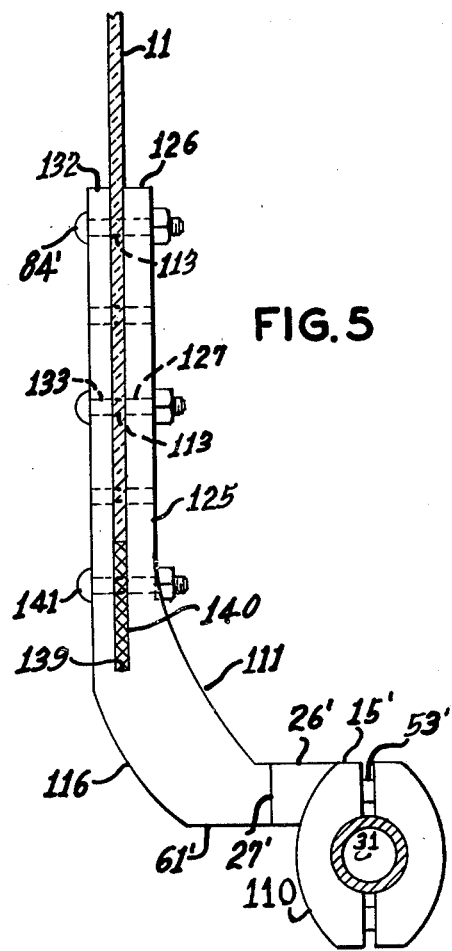

WINDSHIELD MOUNTING ASSEMBLY

BACKGROUND OF THE INVENTION

1. Field of the Invention

This invention relates to a vehicle windshield and more particularly to an assembly for adjustably mounting such windshield on the handlebars of mopeds, bicycles, motorcycles, snowmobiles or the like.

2. Description of the Prior Art

With the advent of motorcycles and mopeds capable of increased speeds and with stricter safety standards requiring safer windshields, there has been a corresponding demand for economical windshield assemblies. However, problems have been encountered in adequately supporting the windshields with the stability and safety required and expected.

For example, a windshield is subjected not only to bending moments and other forces resulting from its deflection by the air but also intermittent forces applied to the windshield and its mounting assembly as the vehicle encounters bumps, depressions and irregularities in the roadway surface. When a vehicle passes over an irregular road surface, the stresses generated by the impact are generally transferred from the wheels, through the vehicle suspension wherein the stresses are partially absorbed and dampened, and subsequently distributed to various parts of the vehicle such as the windshield. Small motorcycles and mopeds are usually provided with a comparatively smaller and less complex suspension assembly than relatively larger motorcycles and, accordingly, a greater degree of the impact resulting from roadway irregularities may be transferred to the windshield through the handlebars and windshield mounting members extending therebetween.

Additionally, a particular windshield element is subjected not only to various externally applied forces but also stress concentrations resulting from material imperfections; discontinuities such as holes or notches; irregular deflections of the windshield such as would occur where the windshield is unevenly constrained by a windshield mounting member or the like; and other defects. For example, windshields commonly employed on mopeds and small motorcycles often include a pair of vertically spaced mounting holes extending therethrough for receiving fasteners for attaching a windshield to vertical supports which are connected to handlebars. Although the fasteners usually include rubber sleeves or cushions to reduce the impact force transmitted to the area adjacent the windshield holes, a failure, such as by fracture, of the region of the windshield adjacent a connection hole may result from repeated loads with possible dangerous consequences to a vehicle operator. The propagation of a crack about a windshield hole is also likely in view of the relatively high stress concentrations which occur adjacent holes, notches and other physical irregularities when a load or force is applied to the windshield. Failure of a windshield element may result not only from material defects but failure may also occur as a result of the means or manner by which the windshield is constrained. For example, a relatively thin windshield element rigidly constrained at one or more points may experience severe localized stresses adjacent the mounting point where the deflecting windshield is improperly and/or too rigidly constrained. Therefore, windshields for mopeds and relatively small motorcycles may experience performance problems resulting not only from inherent material and design defects but also resulting from the manner of their installation.

Accordingly, it would be preferable to employ an economical, lightweight mounting member for the handlebars of a relatively small motorcycle or moped which is designed not only to absorb vibrations due to irregular roadway surfaces but also adequately supports the windshield without unduly stressing the regions adjacent one or more mounting holes. Furthermore, reductions in costs of the mounting assembly are important so that the windshield and mounting assembly may be competitive and affordable to the average user of such mopeds and/or bikes.

Windshield mounting assemblies which commonly include handlebar clamping portions and windshield mounting members respectively connected to the clamping portions and a windshield are generally disclosed in U.S. Pat. No. Re. 23,039, 1,532,008, 2,675,266, 3,801,152 and 3,904,238. Of somewhat related interest are U.S. Pat No. 1,498,848 and 1,571,563 which generally disclose a windshield element disposed between two clamping members.

The windshield mounting member constructed according to the present invention is designed to overcome various problems, such as the probable failure of the windshield or its mounting member, which may be encountered with some of the prior art, and to provide a better distribution of forces between the windshield and its mounting members. For example, a relatively large amount of the applied loads transferred between a windshield element and the windshield mounting member constructed according to the present invention may be transmitted as frictional resistance between the surface portions of the mounting member and abutting surface portions of the windshield element thus avoiding many performance problems such as would normally occur with a bearing type connection wherein a windshield is supported by fastening means which extends through a windshield mounting hole and generally engages the edges thereof.

SUMMARY OF THE INVENTION

A general aspect of this invention relates to a windshield mounting assembly comprising a handlebar clamp including a closeable opening having an axis extending therethrough, an element extending laterally outwardly of the handlebar clamp, an elongated windshield mounting member having an inner end portion adjacent to the element and extending laterally of the axis, and connecting means for movably attaching the mounting member inner end portion to the element and for closing the opening. Further, a mounting member outer end portion is adapted receive a windshield fastening means for attaching a windshield thereto.

Another aspect of this invention relates to a mounting member outer end portion which includes bifurcated legs defining a plane therebetween extending generally parallel with either the axis of the opening and/or an element end wall wherein the legs are adapted to receive a portion of a windshield therebetween. At least one of the legs includes a passage extending therethrough adapted to receive a windshield fastening means for attachment of a windshield portion to the leg and a ledge means extends generally between the legs for supporting a windshield edge.

Yet another aspect of the present invention relates to a connecting means pivotally attaching the mounting member in fixed abutting relationship with the spacer element.

A further aspect of this invention relates to a handlebar clamp including a pair of adjacent elongated brackets having spaced end portions and facing surfaces being generally concave adjacent the central portion thereof and each end portion of each bracket having an aperature aligned with an aperature of the other bracket and forming first and second aligned passageways. The outwardly extending element includes a passageway extending therethrough and aligned with the first aligned passageway of the brackets, and the connecting means extends through the first aligned passageway and the element passageway and includes an end portion connected to the mounting member inner end portion.

A more specific aspect of this invention relates to a windshield mounting assembly wherein the other of said legs includes a passage aligned with the passage in the one leg and the windshield fastening means extends through both passages and is adapted to extend through an aligned windshield opening.

Another specific aspect of this invention relates to a windshield mounting member wherein one of the legs includes a pair of spaced flanges extending substantially between its upper portion and the mounting member inner end portion and whereas the other of the legs includes opposite side portions provided with indentations or cavity portions extending substantially between its upper portion and the mounting member inner end portion. The mounting member intermediate portion generally includes front and rear sides and opposite sides and having a lateral dimension between its opposite sides wherein each side has a cavity formed therein with the bottom of each cavity defining a reinforcing web between the front and rear sides.

Yet another specific aspect of this invention relates to a connection formed between the bifurcated legs and a windshield element secured therebetween wherein the legs have a comparatively greater combined flexural stiffness adjacent their base portions than adjacent their outer end portions.

A further specific aspect of the present invention relates to a mounting member outer end portion extending generally perpendicular to the inner end portion and one of the legs includes a windshield abutting surface, the general plane of which extends generally parallel with the axis of the closeable opening and the socket is generally located between the general plane and the axis.

Still another specific aspect of the present invention relates to a mounting member inner end portion having a passage extending therethrough and including means for engaging the connecting means when the connecting means extends through the passage, wherein the means for engaging comprises a generally recessed socket having at least one bearing surface and the connecting means includes at least one shoulder portion disposed in abutting relationship with a bearing surface to inhibit relative movement and rotation therebetween.

Accordingly, it is a general object to provide an economical means for mounting a windshield to the aforementioned types of vehicles wherein the windshield mounting means meets standards of stability and safety.

Another object of the invention is to provide a relatively simple mounting means which may be easily applied and adjusted to various handlebars.

A further object of the present invention is to provide a lightweight yet rigid mounting member which may be mounted to various sizes and shapes of handlebars.

A particular object is to provide a mounting assembly for supporting the bottom edge of a windshield thereby inhibiting cracks or failures thereof.

A specific object is to provide a mounting assembly of a minimum number of parts which also permits adequate pivotal adjustments thereof between windshield and handlebars.

Another specific object is the provision of a windshield mounting assembly in which the shock or wind forces are distributed more evenly throughout the mounting member and over greater windshield surfaces in contact therewith.

Other objects include an improved windshield mounting assembly which is readily fabricated and inexpensive in construction and installation, and durable and efficient in use.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 1 is a rear elevational view of a pair of windshield mounting assemblies attaching a windshield to a pair of handlebars;

FIG. 2 is an enlarged side elevational view of the mounting assembly of FIG. 1;

FIG. 3 is a reduced front view of the mounting assembly of FIG. 2 with the handlebar clamp portion rotated 180°;

FIG. 4 is an enlarged cross-sectional view taken along line 4—4 of FIG. 1 showing a slightly modified form of the invention; and FIG. 5 is a side elevational view of a second embodiment of the invention.

DETAILED DESCRIPTION OF THE INVENTION

Referring now more particularly to the drawings, FIG. 1 generally illustrates two windshield mounting assemblies 10 connecting a windshield 11, which may be of a generally planar or curved configuration, to a pair of handlebars 12 for a small vehicle, such as a moped, bicycle or small motorcycle. More specifically shown in FIGS. 2, 3 and 4, a windshield mounting assembly 10 generally comprises a handlebar clamp 15; an element 26 extending laterally outwardly of the handlebar clamp 15; an elongated windshield mounting member 60 having an inner end portion 61 adjacent to element 26; and connecting means 53 for movably attaching the mounting member 60 to the element 26.

The handlebar clamp 15, preferably formed of a rigid plastic material, comprises a pair of adjacent elongated brackets; a front bracket 16 adapted to generally abut the front side of the handlebars 9 and a rear bracket 36 designed to abut the rear or rider's side of the handlebars 12. Front bracket 16 includes spaced end portions 17 and 19 and an intermediate portion 18 and, similarly, the rear bracket 36 includes spaced end portions 37 and 39 with an intermediate portion 38 therebetween. Additionally, the front 16 and rear 36 brackets include respective inner 20, 40 and outer 21, 41 surfaces extending in substantially parallel relationship and wherein the respective inner surfaces 20, 40 comprise facing surfaces which are generally concave adjacent the central or intermediate portions 18, 38 of the brackets. The generally concave facing surface portions 22, 42 of the bracket elements define a closeable opening 30 having an axis 31 extending therethrough, generally parallel with the adjacent longitudinal portion of the handlebars. Extending perpendicular to the axis 31 on the respective outer surfaces 21, 41 of the brackets 16, 36 are respective spaced flanges 25, 45 which additionally reinforce the brackets. Further, end portions 17 and 19 of bracket 16 include respective aperatures 23 and 24 and, similarly, end portions 37 and 39 of bracket 36 include respective apertures 43 and 44. When brackets 16 and 36 are disposed with their inner surfaces 20 and 40 in adjacent facing relationship, the generally aligned apertures 23 and 43 of adjacent end portion 17 and 37 form a first aligned passageway 33 and corresponding aligned apertures 24 and 44 of adjacent end portions 19 and 39 form a second aligned passageway 34. Connecting means in the form of fastening means 53 and 54 extend through respective aligned openings 33 and 34 for adjustably closing the opening 30; however, depending on the particular cross-sectional configuration of the handlebars and the concave facing surfaces 22 and 42, bracket gaps 32 may exist between the facing surfaces of respective end portions 17 and 37 and/or end portions 19 and 39 when the concave facing surfaces 22 and 42 are tightly engaged with a handlebar. Thus, it is conceivable that a range of clamping forces may be selectively applied to the handlebars by spaced brackets 16 and 36 by tightening respective fastening means 53 and 54 without substantially closing opening 30. Further, at least one bearing surface 48 is formed on bracket 16 adjacent aperture 24 for receiving at least one fastening means shoulder portion, in the form of side surface 56 on nut 55 as shown in FIGS. 2, 3, 4, whereby the nut 55 is disposed in fixed abutting relationship with one or more of the bearing surfaces 48 to inhibit rotation of the fastening means 54.

Extending laterally outwardly of the handlebar clamp 15 and, in particular, from bracket surface 21 is an element 26 having a relatively flat end wall 27 spaced from surface 21. Although element 26 is shown to be integrally formed with bracket 16 in FIGS. 2 and 4, it is envisioned that element 26 may be formed separately from bracket 16 and/or additional elements may be incorporated with element 26 to, for example, to adjustably position mounting member 60 at selected distances from the handlebars 12. Further, for example, a rigid hard rubber material may be incorporated with element 26 to absorb some of the vibrations transmitted from the vehicle frame and through the mounting member to the windshield. The mounting member 60 is pivotally connected to the element 26 and, as shown in FIGS. 2 and 4, element 26 includes a passage 28 extending therethrough, generally aligned with first passageway 33, wherein fastening means 53 extends through first passageway 33 and element passage 28 and is pivotally connected to the mounting member inner end portion so that, when fastening means 53 is tightened, end wall 27 and a surface portion 62 on mounting member inner end portion 61 will be disposed in fixed non-rotatable abutting relationship.

Elongated windshield mounting member 60 generally includes an inner end portion 61, an intermediate portion 85 and an outer end portion 71. Inner end portion 61 extends generally laterally of axis 31 and includes a passage 63 extending therethrough adapted to receive an end portion of fastening means 53. To prevent relative rotation between fastening means 53, which includes a nut 57 having one or more flat side surfaces 58, and the mounting member inner end portion 61, a means for engaging the fastening means is provided which generally comprises a recessed socket 64 having at least one bearing surface 65 located adjacent passage 63. The shoulder portion or side surface 58 of nut 57 is adapted to abut in fixed relationship at least bearing surface 65 so that the mounting member 60 may disposed in a fixed relationship to handlebar clamp 15 by tightening fastening means 53.

Outer end portion 71 extends generally perpendicular to inner end portion 61 and includes bifurcated legs 72 and 78 which define a plane therebetween extending generally parallel with end wall 27 and, as shown in FIGS. 2 and 4, the plane also extends generally parallel with axis 31. Extending between legs 72 and 78, generally adjacent respective leg base portions 73 and 79, is a ledge means 82 for supporting an edge of a windshield therebetween. Additionally, the upper portion of the legs include respective aligned apertures 74 and 80 adapted to receive a windshield fastening means 84, in the form of a threaded fastener, which extends through a corresponding aligned windshield opening. In normally mounting a windshield between bifurcated legs 72 and 78, a windshield edge normally abuts the surface of the ledge means 82 when a windshield hole, such as windshield hole 13 in FIG. 4, is generally aligned with apertures 74 and 80. As shown in FIG. 4, the windshield hole 13 may be larger than aligned apertures 74 and 80 so as to not only permit a relative adjustment of the windshield with respect to the legs 72 and 78, but also form a connection wherein the fastening means 84 is normally spaced from the edge surfaces of hole 13 thus avoiding a bearing engagement therebetween. Additionally, a relatively uniformly distributed clamping force may be applied to the windshield by legs 72 and 78 resulting in a frictional engagement therebetween; thus, to an extent, reducing compression stress concentrations on the windshield generally adjacent respective windshield mounting holes. Further leg 78 is comparatively thicker adjacent its base portion 79 than adjacent aperture 80 so that comparatively greater deflection of leg 78 is permitted adjacent aperture 80. Although leg 72 has a relatively uniform thin cross-section as compared with leg 78, two spaced reinforcing flanges 75, as shown in FIG. 3, extend substantially continuously from adjacent aperture 74 to inner end portion 61 where they merge with opposite regions of socket 64.

Intermediate portion 85 extends between inner and outer end portions 61 and 71 and generally comprises a front side 86, a rear side 87 and opposite side portions 88 extending therebetween wherein each opposite side portion 88 includes cavity 89 formed therein with the cavity bottom 90 defining a reinforcing web extending between front 86 and rear 87 sides. As shown in FIG. 2, cavity portion 89 extends continuously from intermediate portion 85 along leg 78 where it terminates adjacent aperture 80. Generally, intermediate portion 85 has an outwardly curved configuration with respect to axis 31 such that legs 72 and 78 define a general place remote from and parallel with axis 31 wherein socket 64 is located between axis 31 and the general plane. Additionally, the intermediate portion may be dimensioned not only to absorb some of the vehicle vibrations transmitted through mounting member 60 but also to selctively dispose the bottom edge of the windshield above the handlebars 9, thus reducing the amount of necessary windshield material.

FIG. 5 is another embodiment of the invention wherein corresponding parts thereof, which are identical in every material respect are identified and include a prime notation. Windshield mounting assembly 110 generally comprises a handlebar clamp 15′, an element 26′ extending laterally outwardly of the handlebar clamp 15′, an elongated windshield mounting member 111, and connecting means 53′ for attaching the mounting member 111 at selected pivotal positions to the elements 26′.

Elongated windshield mounting member 111 generally includes an inner end portion 61′, an intermediate portion 116 and an outer end portion 125. Outer end portion 125 extends in a generally perpendicular direction to inner end portion 61′ and includes bifurcated legs 126 and 132 which define a plane therebetween extending generally parallel with element end wall 27; and preferably parallel with axis 31′, represented by a point in FIG. 5.

Legs 126 and 132 respectively include a plurality of apertures 127 and 133, which generally define a plurality of adjacent aligned passageways for permitting a windshield provided with one or more sets of vertically aligned mounting holes 113 to be selectively positioned and secured between spaced legs 126 and 132 at varying mounting heights. For example, in FIG. 5, spaced mounting holes 113 are provided in windshield 11 and spaced fastening means 84′ extend through mounting holes 113 and adjacent aligned apertures 127 and 133 in respective legs 126 and 132. Further, for example, a ledge means 140 in the form of a substantially rigid but elastic insert of desired dimensions may be disposed between and in abutting relationship with a bottom edge of a windshield and surface 139, which extends between lower portions of legs 126 and 132, to permit a windshield to be selectively mounted between the legs 126 and 132. The ledge means may be held in position by pin means 141 extending through an aperture in the insert and aligned adjacent apertures 127 and 133. It is further envisioned that the intermediate portion 116 may lack the cavities 89 provided in mounting member 60 and legs 126 and 132 may be formed thicker and, accordingly, stiffer than corresponding legs 72 and 78 in mounting member 60.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A windshield mounting assembly comprising a handlebar clamp including a closeable opening having an axis extending therethrough, an element extending laterally outwardly of said handlebar clamp, an elongated windshield mounting member having an inner end portion adjacent to said element and extending laterally of said axis a single, connecting means for movably attaching said mounting member inner end portion to said element and for selectively closing said opening, said mounting member further including an outer end portion having bifurcated legs defining a plane therebetween extending generally parallel with said axis and adapted to receive an outer edge portion of a windshield therebetween.

2. The windshield mounting assembly according to claim 1 further comprising fastening means attached to one of said legs for connecting a windshield thereto.

3. A windshield mounting assembly comprising a handlebar clamp including a closeable opening having an axis extending therethrough, an element extending laterally outwardly of said handlebar clamp, an elongated windshield mounting member having an inner end portion adjacent to said element and extending laterally of said axis, connecting means for movably attaching said mounting member inner end portion to said element and for selectively closing said opening, said mounting member further including an outer end portion having bifurcated legs defining a plane therebetween extending generally parallel with said axis and adapted to receive a portion of a windshield therebetween, one of said legs having a passage extending therethrough and a ledge adapted to support a windshield edge, said passage being adapted to receive a windshield fastening means therethrough for attachment of a windshield thereto.

4. The windshield mounting assembly according to claim 3 wherein the other of said legs includes a passage aligned with said passage in said one leg and said windshield fastening means extends through both said passages and being adapted to extend through a windshield aligned opening.

5. A windshield mounting assembly comprising a handlebar clamp including a closeable opening having an axis extending therethrough, an element extending laterally outwardly of said handlebar clamp, an elongated windshield mounting member having an inner end portion adjacent to said element and extending laterally of said axis, connecting means for movably attaching said mounting member inner end portion to said element and for selectively closing said opening, said mounting member further including an outer end portion having bifurcated legs defining a plane therebetween extending generally parallel with said axis and adapted to receive a portion of a windshield therebetween, one of said legs having a passage for receiving a windshield fastening means therethrough and a ledge extending from one side thereof, said one leg having a pair of spaced flanges extending from the opposite side thereof, said spaced flanges extending substantially continuously between said passage and said inner end portion.

6. A windshield mounting assembly comprising a handlebar clamp including a closeable opening having an axis extending therethrough, an element extending laterally outwardly of said handlebar clamp, an elongated windshield mounting member having an inner end portion adjacent to said element and extending laterally of said axis, connecting means for movably attaching said mounting member inner end portion to said element and for selectively closing said opening, said mounting member further including an outer end portion having bifurcated legs defining a plane therebetween extending generally parallel with said axis and adapted to receive a portion of a windshield therebetween, each of said legs having upper and lower portions, said mounting member further including a ledge extending between the lower portions of said legs, one of said legs includes a pair of spaced flanges extending substantially between its said upper portion and said mounting member inner end portion and the other of said legs includes opposite side portions provided with indentations extending substantially continuously between its said upper portion and said mounting member inner end portion.

7. A windshield mounting assembly comprising a handlebar clamp including a closeable opening having an axis extending therethrough, an element extending laterally outwardly of said handlebar clamp, an elongated windshield mounting member including an outer end portion extending generally vertically and adapted to receive and support an outer edge portion of a windshield, said outer end portion being located above said opening, said mounting member including an inner end portion having a surface adjacent to said element and extending generally laterally of and below said axis, and connecting means for pivotally attaching said mounting member inner end portion to said element with said surface of said inner end portion and said element in abutting relationship.

8. The windshield mounting assembly according to claim 7 wherein said element includes a passage extending therethrough, said connecting means includes an intermediate portion extending through said element passage, said connection means further including spaced end portions connected respectively to said handlebar clamp and said mounting member inner end portion.

9. The windshield mounting assembly according to claim 8 wherein said mounting member inner end portion includes a passage extending therethrough, said mounting member inner end portion including means for engaging said connecting means when said connecting means extends through said passage.

10. A windshield mounting assembly comprising a handlebar clamp including a closeable opening having an axis extending therethrough, an element extending laterally outwardly of said handlebar clamp, an elongated windshield mounting member including an outer end portion and an inner end portion having a surface adjacent to said element and extending generally laterally of said axis, and connecting means for pivotally attaching said mounting member inner end portion to said element with said surface of said inner end portion and said element in abutting relationship, said mounting member inner end portion including a passage extending therethrough, said mounting member inner end portion including means for engaging said connecting means when said connecting means extends through said passage, said means for engaging including a socket having at least one bearing surface, and said connecting means includes at least one shoulder portion disposed in abutting relationship with said one bearing surface to inhibit relative movement therebetween.

11. The windshield mounting assembly according to claim 10 wherein said outer end portion includes a leg portion having a windshield fastening means connected thereto, and said windshield mounting member further comprising at least one flange substantially extending from adjacent said passage to said leg portion.

12. The windshield mounting assembly according to claim 10 wherein said outer end portion includes bifurcated leg portions adapted to receive an outer edge portion of a windshield therebetween, said mounting member further comprising a pair of spaced flanges extending substantially continuously from one of said leg portions to said inner end portion, said spaced flanges respectively extending on opposite sides of said socket.

13. A windshield mounting assembly comprising a handlebar clamp including a closeable opening having an axis extending therethrough, an element extending laterally outwardly of said handlebar clamp, an elongated windshield mounting member including an outer end portion and an inner end portion having a surface adjacent to said element and extending generally laterally of said axis, and connecting means for pivotally attaching said mounting member inner end portion to said element with said surface of said inner end portion and said element in abutting relationship, said outer end including a leg portion having an upper portion for receiving a windshield fastening means and a lower portion and a surface extending therebetween defining a plane extending generally parallel with said axis when said connecting means secures said windshield mounting means at different pivotal positions with respect to said handlebar clamp.

14. A windshield mounting assembly comprising a handlebar clamp including a pair of adjacent elongated brackets having spaced end portions and facing surfaces being generally concave adjacent the central portion thereof, each end portion of each said bracket having an aperture aligned with an aperture of the other said bracket and forming first and second aligned passageways, one of said brackets including an outwardly extending element having an end portion, an elongated windshield mounting member including an outer end portion having a windshield fastening means connected thereto and an inner end portion adjacent to said element, and a single connecting means for movably attaching said mounting member inner end portion to said element end portion and for selectively closing said opening.

15. The windshield mounting assembly according to claim 14 wherein said element includes a passageway extending therethrough and aligned with said first aligned passageway of said brackets, said connecting means extends through said first aligned passageway and said element passageway, and said connecting means includes an end portion connected to said mounting member inner end portion for pivotally securing said mounting member to said element.

16. The windshield mounting assembly according to claim 15 wherein said mounting member inner end portion includes a passageway extending therethrough, said connecting means end portion extends through said element passageway, and said mounting member having a portion engaging said connecting means end portion for securing said mounting member in a fixed pivotal position with respect to said element.

17. The windshield mounting assembly according to claim 16 wherein said portion for engaging said connecting means end portion comprises a recessed socket having at least one bearing surface, and said connecting means end portion includes at least one shoulder disposed in fixed abutting relationship with one of said bearing surfaces to inhibit rotation of said end portion.

18. The windshield mounting assembly according to claim 16 further comprising another connecting means extending through said second aligned passageway, said one bracket end portion adjacent said second aligned passageway including a recessed socket having at least one bearing surface and said other connecting means includes at least one shoulder portion disposed in fixed abutting relationship with one of said bearing surfaces of said recessed socket.

19. A windshield mounting assembly comprising a handlebar clamp including a pair of adjacent elongated brackets having spaced end portions and facing surfaces being generally concave adjacent the central portion thereof, each end portion of each said bracket having an aperture aligned with an aperture of the other said bracket and forming first and second aligned passageways, one of said brackets including an outwardly extending element having an end portion, an elongated windshield mounting member including an outer end portion having a windshield fastening means connected thereto and an inner end portion adjacent to said element, and connecting means for movably attaching said mounting member inner end portion to said element end portion and for selectively closing said opening, said concave central portions defining a closeable opening having an axis, said outer end portion of said mounting member extends generally perpendicular to said inner end portion and includes a leg having a surface portion adapted to abut a windshield surface, said surface portion extending generally parallel with said axis.

20. The windshield mounting assembly according to claim 19 wherein said outer end portion further comprises a ledge for supporting a windshield edge, said ledge extending generally parallel with said axis.

21. The windshield mounting assembly according to claim 19 wherein said mounting member further comprises an intermediate portion extending between said inner and outer end portions, said intermediate portion having front and rear sides and opposite sides, said intermediate portion having a lateral dimension between its opposite sides, each side having a cavity formed therein with the bottom of each cavity defining a reinforcing web between said front and rear sides.

22. The windshield mounting assembly according to claim 19 wherein the general plane of said surface portion of said leg being remote from said axis, said socket being generally located between said axis and said general plane.

* * * * *